United States Patent [19]

Oda et al.

[11] 4,380,927
[45] Apr. 26, 1983

[54] RIM MECHANISM FOR TIRE INSPECTION ARRANGEMENT

[75] Inventors: Ryoichi Oda, Himeji; Munenori Iuchi, Shirakawa, both of Japan

[73] Assignee: Sumitomo Rubber Industries, Ltd., Hyogo, Japan

[21] Appl. No.: 285,504

[22] Filed: Jul. 21, 1981

[30] Foreign Application Priority Data

Jul. 22, 1980 [JP] Japan ............................ 55-104011[U]

[51] Int. Cl.³ .......................................... G01M 17/02
[52] U.S. Cl. ...................................................... 73/146
[58] Field of Search ...................................... 73/146, 9

[56] References Cited

U.S. PATENT DOCUMENTS

| | | | |
|---|---|---|---|
| 3,552,200 | 1/1971 | Hermanns | 73/146 |
| 3,698,233 | 10/1972 | Braden et al. | 73/146 |
| 3,895,518 | 7/1975 | Leblond | 73/146 |
| 4,023,407 | 5/1977 | Vanderzee | 73/146 |

Primary Examiner—Donald O. Woodiel
Attorney, Agent, or Firm—Birch, Stewart, Kolasch & Birch

[57] ABSTRACT

The disclosure is directed to an improved rim mechanism for tire inspection arrangement in which distance between upper and lower rims is arranged to be altered according to different tire sizes.

3 Claims, 6 Drawing Figures

RIM MECHANISM FOR TIRE INSPECTION ARRANGEMENT

BACKGROUND OF THE INVENTION

The present invention generally relates to an inspection or testing arrangement, and more particularly to an improved rim mechanism of an inspection arrangement for tires of motor vehicles and the like.

Conventionally, as shown in FIG. 1, the tire inspection arrangement generally includes an upper rim mechanism 8 which rotatably supports an upper rim 7, in a position above a main conveyer 6 driven by a motor 5, and located between a carry-in conveyer 2 driven by a motor 1 and a carry-out conveyer 4 driven by another motor 3, a lower rim mechanism 10 which rotatably supports a lower rim 9 for vertical movement as desired and is provided below the main conveyer 6 in a position axially aligned with said upper rim mechanism 8, a vertical vibration or deviation measuring unit 12 arranged to contact one side wall of a tire 11 to be fitted between the upper and lower rims 7 and 9, and a lateral vibration of deviation measuring unit 13 adapted to contact the tread portion of the tire 11.

In the known tire inspection arrangement as described above employing multi-staged rims as shown in FIG. 2, since the distance LW1 between the rims is arranged to be constant, it has been impossible to commonly satisfy or meet distances BW1, BW2, etc. between bead portions of all different tire sizes, thus resulting in faulty fitting between the tires and rims according to tire sizes, with consequent adverse effect to the measuring accuracy.

SUMMARY OF THE INVENTION

Accordingly, an essential object of the present invention is provide an improved rim mechanism of a tire inspection arrangement in which distance between the rims is arranged to be altered according to tire sizes, with substantial elimination of disadvantages inherent in the conventional rim mechanisms of this kind.

Another important object of the present invention is to provide an improved rim mechanism of the above described type which is simple in construction and accurate in functioning at high reliability, and can be readily incorporated into tire inspection arrangements in general at low cost.

In accomplishing these and other objects, according to one preferred embodiment of the present invention, there is provided a rim mechanism for use in a tire inspection arrangement which includes stopper members movably provided in a reduced diameter portion of a core member for an upper rim so as to be selectively projected outwardly from or retracted inwardly into the reduced diameter portion, a central shaft axially extending through the upper rim and coupled thereto for vertical movement and simultaneous rotation in one unit with respect to the upper rim by driving means, cam means provided at the lower end portion of the central shaft for the selective projection and retraction of the stopper members from and into said reduced diameter portion in association with the vertical movement of the central shaft, a support shaft axially extending through a core member of the lower rim having a hollow cylindrical portion to be fitted into the reduced diameter portion of said upper rim, for vertically moving the lower rim with respect to the upper rim and also rotating the lower rim through a predetermined angle with respect to the upper rim by driving means, and lower engaging stepped portions to be stopped by the stopper members so as to set the lower rim at a position for defining a predetermined rim width with respect to the upper rim and upper engaging stepped portions to be stopped by the stopper members so as to set the lower rim at another position for defining a rim width slightly broader than said predetermined rim width with respect to the upper rim which are respectively provided on the hollow cylindrical portion of the core member for the lower rim in positions of displacement in the direction of rotation of the lower rim. The stopper members are arranged to be displaced by the rotation of the support shaft for changing over of the engaging positions thereof between the lower engaging stepped portions and the upper engaging stepped portions.

By the arrangement of the present invention as described above, an improved rim mechanism for the tire inspection arrangement capable of altering distance between the rims has been advantageously presented for efficient and accurate inspection of tires.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
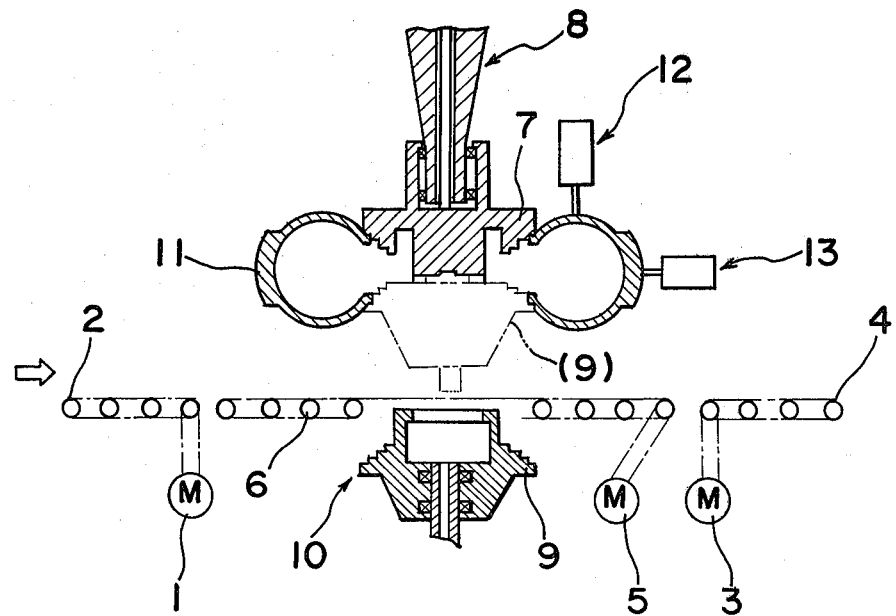
FIG. 1 is a schematic side sectional view showing the construction of a conventional tire inspection arrangement (already referred to)
Figure 2:
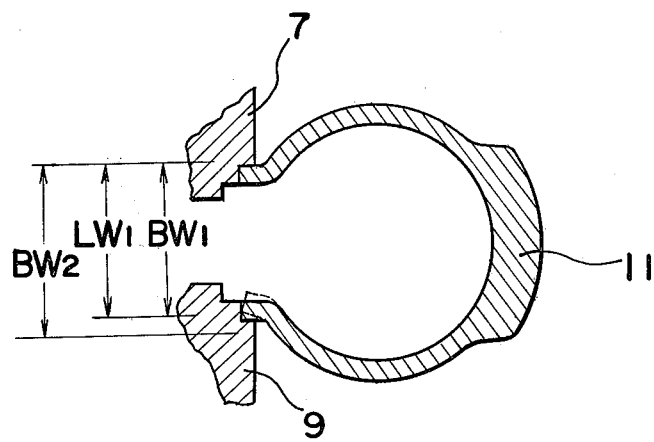
FIG. 2 is a side sectional view showing the state of a tire fitted between upper and lower rims of a rim mechanism employed in the arrangement of FIG. 1 (already referred to)
Figure 3:
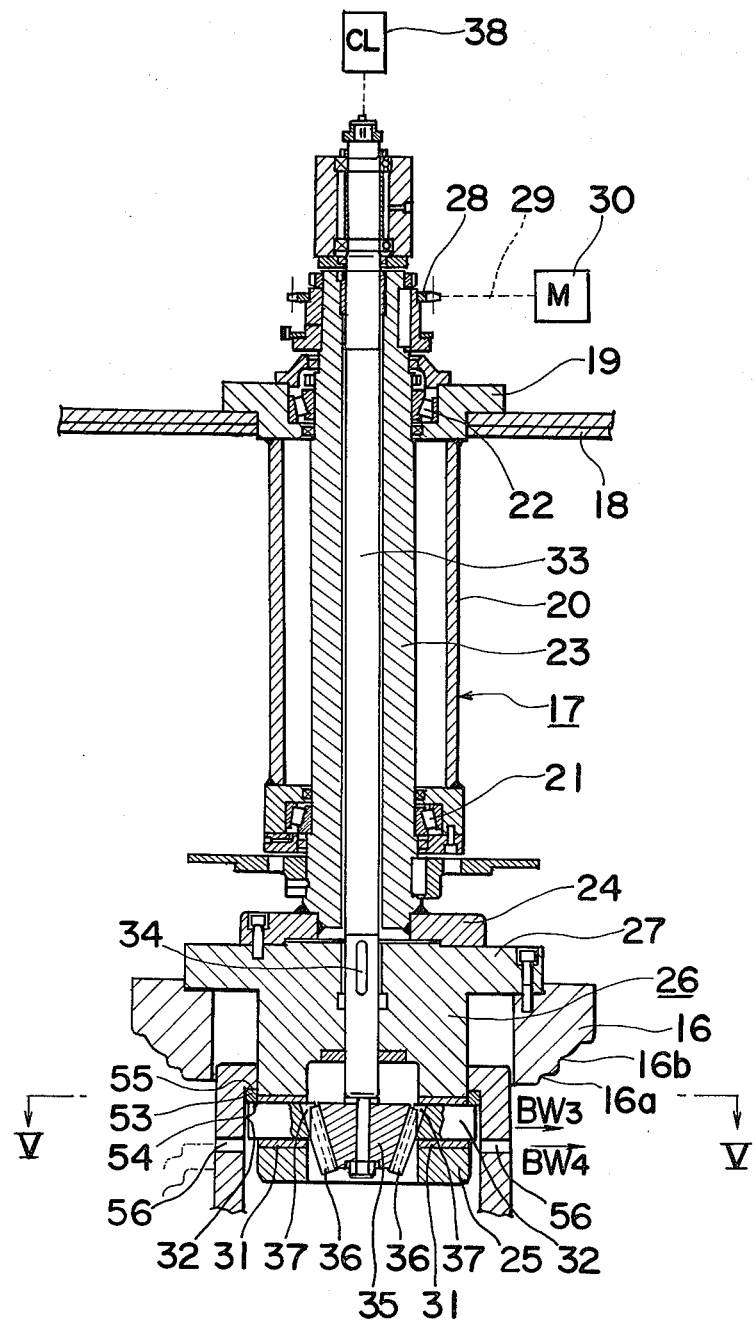
FIG. 3 is a side sectional view of an upper rim mechanism according to one preferred embodiment of the present invention.

Referring now to the drawings, there is shown in FIG. 3 the construction of an upper rim mechanism 17 which constitutes the improved rim mechanism of a tire inspection arrangement according to the present invention, together with a lower rim mechanism 45 to be described in detail later. The upper rim mechanism 17 for supporting an upper rim 16 formed with stepped portions 16a and 16b which conform to bead widths BW3 and BW4 of tires (not shown here) with different sizes, is arranged to rotatably support a hollow shaft 23 through bearings 21 and 22 respectively provided at upper and lower portions of a bearing sleeve 20 which is secured, at its flange portion 19, to a base plate 18, while a core member 26 having an upper large diameter portion or flange portion 27 and a lower reduced diameter portion 25 is fixed, at said flange portion 27, to a corresponding flange portion 24 provided at the lower end of said hollow shaft 23, for example, by securing screws, with the upper rim 16 being further secured to the flange portion 27 of said core member 26 by securing screws and the like.

To the upper end of the hollow shaft 23, there is fixedly mounted a gear 28 which is coupled to a motor 30 through a chain belt 29 or the like for rotating said hollow shaft 23 and consequently the upper rim 16 secured thereto, by said motor 30 at a predetermined speed.

Figure 5:
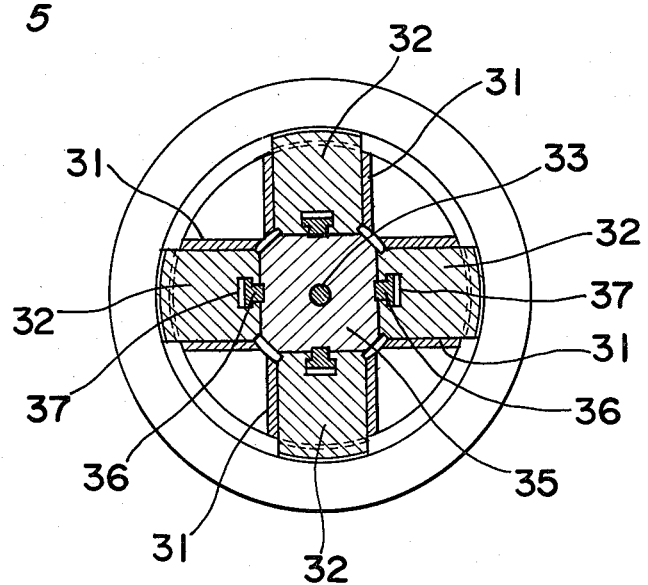
FIG. 5 is a cross section, on an enlarged scale, taken along the line V—V of FIG. 3.

As also shown in FIG. 5, in the lower part of the reduced diameter portion 25 of said core member 26, there are provided a plurality of stopper members 32, e.g. four stopper members in this embodiment, movably accommodated in corresponding guide members 31 which are fitted into bores formed in said reduced diameter portion 25, so as to be radially outwardly extended from or radially inwardly retracted into said portion 25 as desired.

Extended through the hollow shaft 23 and the central portion of the core member 26 is a central shaft 33 which is arranged to be vertically movable with respect to the upper rim 16 through its key portion 34 engaged with a key way (not shown) formed in the core member 26 and also to be simultaneously rotatable with said upper rim 16, while, to the lower end of said central shaft 33, there is fixed an associating cam member 35 of an inverted quadrangular pyramid-like configuration, for example, by a bolt, with projections 36 each having a T-shaped cross section (FIG. 5) and provided on four side faces of said cam member 35 being movably fitted into corresponding recesses 37 each having a similar T-shaped cross section and formed in base portions of said stopper members 32, and thus, the stopper members 32 are adapted to selectively extended from or retracted into the reduced diameter portion 25 of the core member 26 in association with the vertical movement of the central shaft 33, which is effected by reciprocating movement given by a driving means 38, for example, a hydraulic cylinder, solenoid or the like connected to the upper end of said central shaft 33 (FIG. 3).

Figure 4:
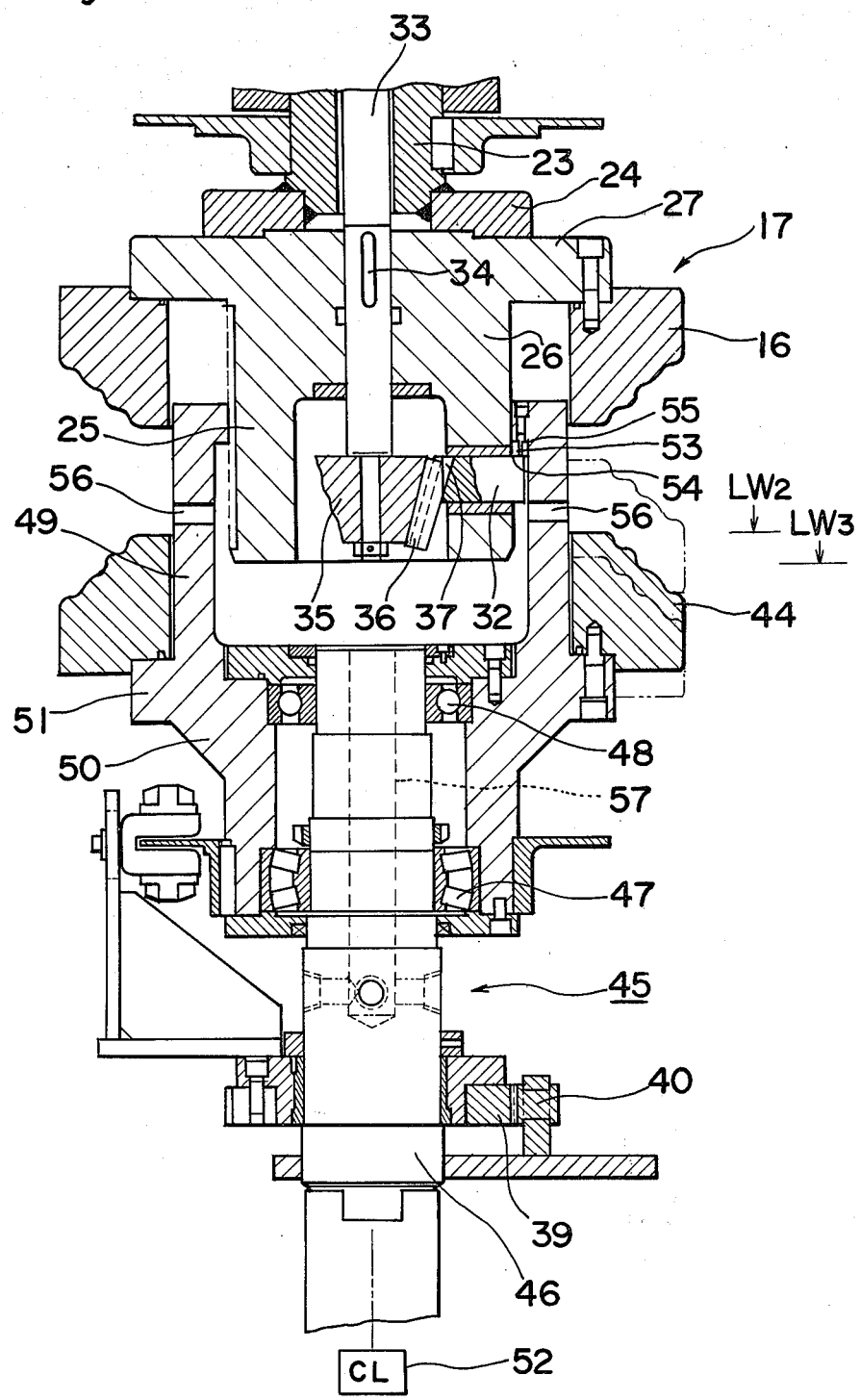
FIG. 4 is a side sectional view showing, on an enlarged scale, the construction of a lower rim mechanism according to the present invention.

On the other hand, as shown in FIG. 4, the lower rim mechanism 45 for supporting a lower rim 44 having a similar configuration to the upper rim 16, generally includes a support shaft 46, a core member 50 having a large diameter flange portion 51 and a hollow cylindrical portion 49 with a diameter smaller than that of the flange portion 51 so as to extend upwardly from said flange portion 51, and rotatably supported at the upper portion of the support shaft 46 through bearings 47 and 48, and the lower rim 44 secured to the upper surface of the flange portion 51 of the core member 50 in a position around said cylindrical portion 49, for example, by securing screws.

The lower end of the support shaft 46 is coupled to a suitable driving means 52 such as a hydraulic cylinder, solenoid or the like, for selective upward or downward movement of said lower rim 44 together with said support shaft 46 through reciprocating movement imparted by the driving means 52.

Figure 6:
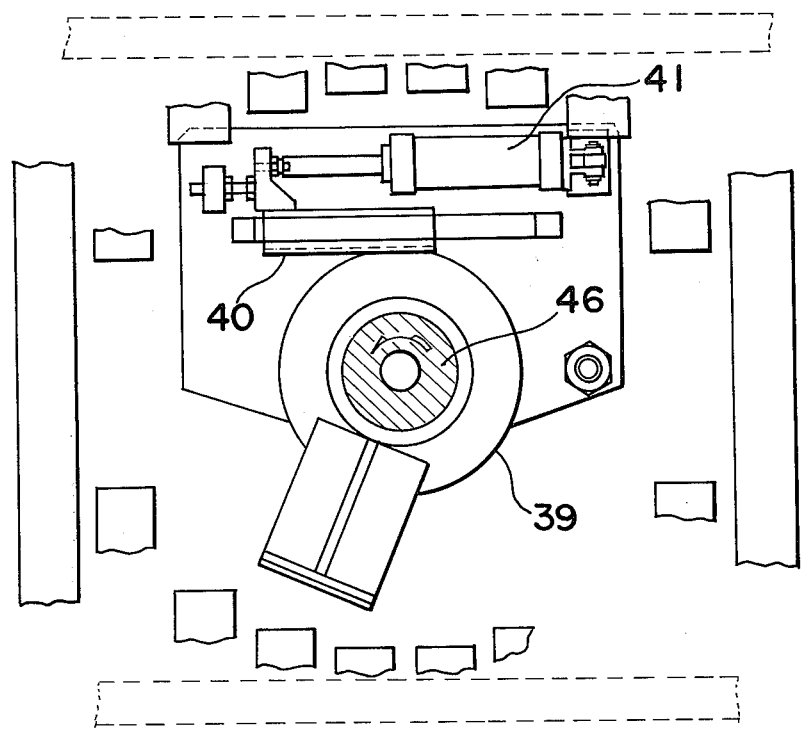
FIG. 6 is a schematic top plan view explanatory of a stopper rotating mechanism employed in the mechanisms of FIGS. 3 and 4.

As is also shown in FIG. 6, a large diameter gear 39 is fixedly mounted on the support shaft 46 in a position below the core member 50, and by reciprocating a rack 40 in mesh with the gear 39 by a suitable driving means 41 coupled to said rack 40, the support shaft 46 may be rotated through a predetermined angle of 45°.

The hollow cylindrical portion 49 of the core member 50 has such external and internal diameters as will be fitted into a space between the reduced diameter portion 25 of the core member 26 and the upper rim 16 for the upper rim mechanism 17 through respective small clearances therebetween, and is provided, at its inner upper edge, with lower engaging stepped portions 54 which are to be stopped by the stopper members 32 through spacers 53 for setting the lower rim 44 to a specified rim width LW2 with respect to the upper rim 16, and upper engaging stepped portions 55 which are to be stopped by the stopper members 32 without the above spacers 53 for setting the lower rim 44 to a rim width LW3 slightly broader than the specified rim width LW2, said stepped portions 54 and 55 being alternately arranged in positions deviated through 45° in the direction of rotation of said support shaft 46.

Moreover, the hollow cylindrical portion 49 of the core member 50 for the lower rim mechanism 45 is formed, in its peripheral wall, with air filling ports 56 for filling air into the tire 11 (not particularly shown in FIG. 4) fitted between the upper and lower rims 16 and 44 so as to supply compressed air through an air supply passage 57 axially formed in the support shaft 46.

By the above arrangement, upon rotation of the upper rim 16 through driving by the motor 30, the lower rim 44 is also synchronously rotated owing to the tension of the tire 11 held between the upper and lower rims 16 and 44, and thus, as a whole, the tire 11 is caused to be rotated by the upper and lower rims 16 and 44, during which time, the vertical vibration and lateral vibration of the tire 11 are measured by the vertical vibration measuring device 12 and lateral vibration measuring device 13 respectively brought into contact with the side wall and tread portion of the rotating tire 11 as described earlier.

In the above case, when the bead width of the tire 11 is broader than the specified rim width LW3, sufficiently close contact of the bead portion of the tire 11 to the lower rim 44 can not be achieved, thus resulting in undesirable leakage of air.

In the case as described above, the large diameter gear 39 fixedly mounted on the support shaft 46 is caused to rotate through the rack 40 in mesh therewith by the actuation of the driving means 41 so as to turn the hollow cylindrical portion 49 of the core member 50 for the lower rim mechanism 45 through a predetermined angle of 45° following rotation of the support shaft 46, and thus, the stopper members 32 are disengaged from the lower engaging stepped portions 54, with consequent descent of the lower rim 44, and come to be engaged with the upper engaging stepped portions 55. Accordingly, the upper and lower rims 16 and 44 are reset to the rim width LW4 broader than the specified rim width LW3, and the bead portion of the tire 11 fitted between the rims 16 and 44 comes into sufficiently close contact with the lower rim 44, with consequent elimination of air leakage. In the above state, the measuring of the tire 11 is continuously carried out by the measuring devices 12 and 13 as described earlier.

Upon completion of the measurements of the tire 11, the stopper members 32 are retracted into the reduced diameter portion 25 of the core member 26 by the actuation of the driving means 38, and subsequently, the lower rim 44 is caused to descend through the support shaft 46 by the cylinder 52 for removal of the measured tire 11 from the upper and lower rims 16 and 44. Thereafter, the hollow cylindrical portion 49 of the core member 50 is returned for rotation back to the engaging portions of the lower engaging stepped portions 54 through the support shaft 46 by the actuation of the driving means 41, and thus, one measuring cycle is completed.

As is clear from the foregoing description, according to the present invention, the lower engaging stepped portions and upper engaging stepped portions to be stopped by the stopper members of the reduced diameter portion of the upper rim mechanism are provided in the hollow cylindrical portion of the core member for the lower rim mechanism so as to displace the stopper members through rotation of the support shaft for changing over from the lower engaging stepped portions in which the lower rim is brought to the position to provide the specified rim width with respect to the upper rim, to the upper engaging stepped portions which provide the rim width slightly broader than the specified rim width, and therefore, even in the case where bead widths of tires are slightly different, it is possible to bring the bead portions into sufficiently close contact with the upper and lower rims by adjusting the position of the lower rim in the above described manner. Accordingly, by the arrangement of the present invention, measurements of tire vibrations can be efficiently effected at high accuracy at all times.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. In a tire inspection arrangement which includes a rim mechanism having an upper rim mechanism rotatably supporting an upper rim and a lower rim mechanism also rotatably supporting a lower rim for vertical movement with respect to said upper rim for inspecting a tire fitted between said upper and lower rims, the improvement of said rim mechanism which comprises stopper members movably provided in a reduced diameter portion of said upper rim so as to be selectively projected radially outwardly from and retracted radially inwardly into said reduced diameter portion, a central shaft axially extending through said upper rim and coupled thereto for vertical movement and simultaneous rotation in one unit with respect to said upper rim by driving means, cam means provided at the lower end portion of said central shaft for said selective projection and retraction of said stopper members from and into said reduced diameter portion in association with the vertical movement of said central shaft, a support shaft axially extending through said lower rim having a hollow cylindrical portion to be fitted into said reduced diameter portion of said upper rim, for vertically moving said lower rim with respect to said upper rim and also rotating said lower rim through a predetermined angle with respect to said upper rim by driving means, and lower engaging stepped portions to be stopped by said stopper members so as to set the lower rim at a position for defining a predetermined rim width with respect to said upper rim and upper engaging stepped portions to be stopped by said stopper members so as to set the lower rim at another position for defining a rim width slightly broader than said predetermined rim width with respect to said upper rim, said lower and upper engaging stepped portions being respectively provided on the hollow cylindrical portion of said lower rim in positions of displacement in the direction of rotation of said lower rim, said stopper members being displaced by the rotation of said support shaft for changing over of the engaging positions thereof between the lower engaging stepped portions and the upper engaging stepped portions.

2. A rim mechanism as claimed in claim 1, wherein said driving means for said central shaft includes means for reciprocating the central shaft and another means for rotating said central shaft.

3. A rim mechanism as claimed in claim 1, wherein said driving means for said support shaft includes means for reciprocating the support shaft and another means for rotating said support shaft through the predetermined angle of 45°.

* * * * *